United States Patent
Krishnamoorthy et al.

(10) Patent No.: US 9,502,957 B2
(45) Date of Patent: *Nov. 22, 2016

(54) SYSTEM AND METHOD FOR SUPPLYING POWER AT STARTUP

(71) Applicant: Marvell World Trade LTD., St. Michael (BB)

(72) Inventors: Ravishanker Krishnamoorthy, Singapore (SG); Radu Pitigoi-Aron, San Jose, CA (US); Siew Yong Chui, Singapore (SG)

(73) Assignee: Marvell World Trade LTD., St. Michael (BB)

( * ) Notice: Subject to any disclaimer, the term of this patent is extended or adjusted under 35 U.S.C. 154(b) by 99 days.

This patent is subject to a terminal disclaimer.

(21) Appl. No.: 14/289,922

(22) Filed: May 29, 2014

(65) Prior Publication Data

US 2014/0268937 A1    Sep. 18, 2014

Related U.S. Application Data

(63) Continuation of application No. 13/449,407, filed on Apr. 18, 2012, now Pat. No. 8,742,735.

(60) Provisional application No. 61/486,488, filed on May 16, 2011.

(51) Int. Cl.
  *G05F 1/40* (2006.01)
  *H02M 1/36* (2007.01)
  *H02M 7/217* (2006.01)

(52) U.S. Cl.
  CPC ............... *H02M 1/36* (2013.01); *H02M 7/217* (2013.01); *H02M 7/2176* (2013.01)

(58) Field of Classification Search
  CPC .................... H02M 7/217; H02M 2001/0006; H02M 1/36; G05F 1/44

USPC ............ 363/16, 39, 41, 46, 21.6, 49, 89, 97; 315/219, 224, 247, 307, 308, 291; 323/207, 209, 282–288

See application file for complete search history.

(56) References Cited

U.S. PATENT DOCUMENTS 4,072,890 A    2/1978  Westbrook et al.
4,097,708 A    6/1978  Bickel (Continued)

FOREIGN PATENT DOCUMENTS

CN    1378285 A      11/2002
CN    101951137 A     1/2011

(Continued)

OTHER PUBLICATIONS

PCT International Search Report for Application No. PCT/IB10/03465; Jun. 14, 2011; 2 pages.

(Continued)

*Primary Examiner* — Rajnikant Patel

(57) ABSTRACT

A system including a switch and a control circuit. The switch is configured to receive a first voltage. The control circuit is configured to, during a rising portion of a half cycle of the first voltage, (i) turn on the switch in response to the first voltage reaching a first value, and (ii) turn off the switch in response to the first voltage reaching a second value, where the second value is greater than the first value. The control circuit is further configured to, during a falling portion of the half cycle of the first voltage, (i) turn on the switch in response to the first voltage reaching the second value, and (ii) turn off the switch in response to the first voltage reaching the first value.

22 Claims, 5 Drawing Sheets

(56) References Cited

U.S. PATENT DOCUMENTS

| | | | |
|---|---|---|---|
| 4,553,082 A | 11/1985 | Nesler | |
| 4,859,921 A | 8/1989 | Archer | |
| 5,039,931 A | 8/1991 | Wieland | |
| 5,192,906 A * | 3/1993 | Nathan | H02M 3/156 323/282 |
| 5,302,889 A * | 4/1994 | Marsh | H02M 7/2176 323/284 |
| 5,359,281 A | 10/1994 | Barrow et al. | |
| 5,360,962 A | 11/1994 | Pettit | |
| 5,479,090 A * | 12/1995 | Schultz | H02M 3/156 323/284 |
| 5,546,043 A | 8/1996 | Pollmeier | |
| 5,559,395 A | 9/1996 | Venkitasubrahmanian et al. | |
| 5,608,614 A | 3/1997 | Ohnishi et al. | |
| 5,712,774 A * | 1/1998 | Uramoto | H02M 1/4208 323/209 |
| 5,798,635 A | 8/1998 | Hwang et al. | |
| 5,869,935 A | 2/1999 | Sodhi | |
| 6,075,715 A | 6/2000 | Maehara et al. | |
| 6,229,681 B1 * | 5/2001 | Lee | H02H 7/1222 361/115 |
| 6,369,109 B1 | 4/2002 | Debatin et al. | |
| 6,369,409 B1 | 4/2002 | Takasu et al. | |
| 6,448,713 B1 | 9/2002 | Farkas et al. | |
| 7,609,036 B2 | 10/2009 | Bartolo et al. | |
| 8,482,945 B2 | 7/2013 | Kojima | |
| 8,618,785 B2 * | 12/2013 | Tiruvuru | H02M 1/36 323/285 |
| 9,287,707 B2 | 3/2016 | Tiruvuru | |
| 2002/0089233 A1 | 7/2002 | Nakamura | |
| 2002/0134999 A1 * | 9/2002 | Hirokawa | H02M 3/155 257/258 |
| 2003/0034763 A1 | 2/2003 | Bruno | |
| 2003/0057871 A1 | 3/2003 | Kominami et al. | |
| 2006/0034109 A1 | 2/2006 | Benabdelaziz et al. | |
| 2006/0062026 A1 | 3/2006 | Wittenbreder | |
| 2006/0284698 A1 | 12/2006 | Vaisanen | |
| 2007/0034956 A1 | 2/2007 | Lee et al. | |
| 2007/0274104 A1 | 11/2007 | Furukoshi et al. | |
| 2008/0237777 A1 | 10/2008 | Hu et al. | |
| 2009/0009241 A1 | 1/2009 | Park et al. | |
| 2009/0134468 A1 | 5/2009 | Tsuchiya et al. | |
| 2009/0166720 A1 | 7/2009 | Zundel | |
| 2009/0230870 A1 * | 9/2009 | Quazi | H05B 41/042 315/85 |
| 2009/0258617 A1 | 10/2009 | Yoshihara | |
| 2009/0316456 A1 | 12/2009 | Wu | |
| 2010/0270620 A1 | 10/2010 | Dibra et al. | |
| 2011/0042726 A1 | 2/2011 | Banerjee et al. | |
| 2012/0313692 A1 | 12/2012 | Sutardja et al. | |
| 2013/0336028 A1 | 12/2013 | Kawamura | |

FOREIGN PATENT DOCUMENTS

| | | |
|---|---|---|
| DE | 3304759 A1 | 8/1984 |
| EP | 0700152 A1 | 3/1996 |
| EP | 1626493 A1 | 2/2006 |
| JP | 2002142447 A | 5/2002 |
| JP | 2003079155 A | 3/2003 |
| TW | 200839893 A | 10/2008 |

OTHER PUBLICATIONS

PCT International Search Report for Application No. PCT/US2012/037460; Aug. 7, 2012; 5 pages.

PCT International Search Report for Application No. PCT/US2012/037466; Jun. 20, 2013; 4 pages.

European Search Report for Application No. 10 731 793.5-1812 dated Aug. 8, 2014; 13 Pages.

Chinese Office Action for Chinese Application No. 201080049984.2 dated Aug. 22, 2014; 9 Pages.

Chinese Search Report for Chinese Application No. 201280023860.6 dated Oct. 10, 2015; 2 Pages.

Taiwanese Office Action for Taiwanese Application No. 101120127 dated Dec. 8, 2015; 9 Pages.

Japanese Office Action for Japanese Application No. JP2014-511414 dated Mar. 22, 2016; 2 Pages.

Taiwanese Office Action for Application No. 101120127 dated Jun. 13, 2016.

* cited by examiner

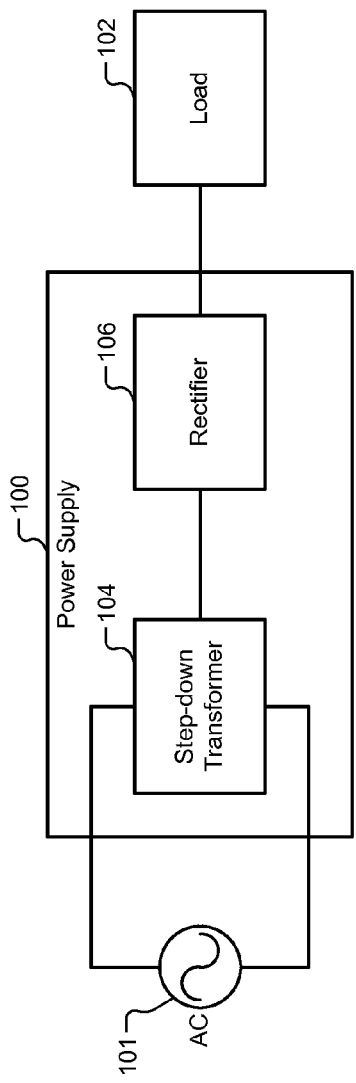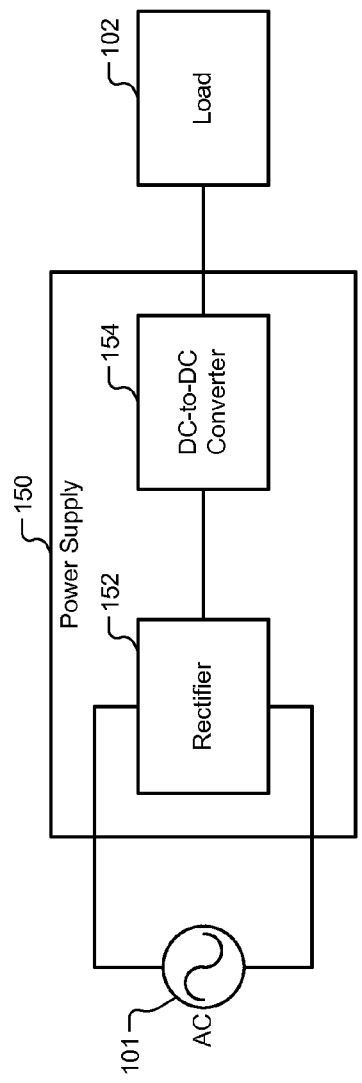
FIG. 1
Prior Art
FIG. 2
Prior Art

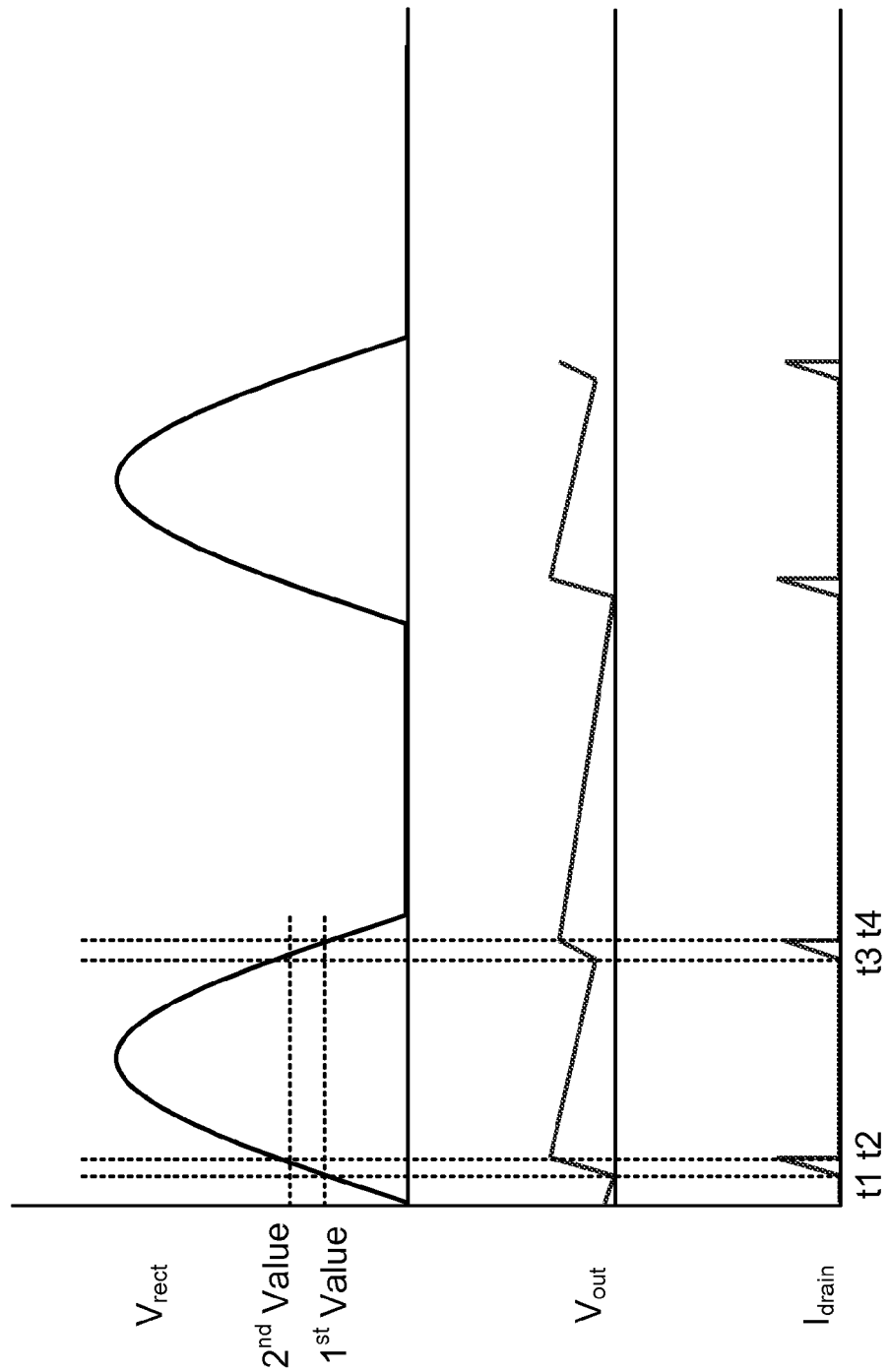

SYSTEM AND METHOD FOR SUPPLYING POWER AT STARTUP

CROSS-REFERENCE TO RELATED APPLICATIONS

This present disclosure is a continuation of U.S. patent application Ser. No. 13/449,407 (now U.S. Pat. No. 8,742,735), filed on Apr. 18, 2012, which claims the benefit of U.S. Provisional Application No. 61/486,488, filed on May 16, 2011.

This application is related to U.S. application Ser. No. 13/467,648, filed on May 9, 2012 which claims the benefit of U.S. Provisional Application No. 61/494,619, filed on Jun. 8, 2011.

The entire disclosures of the applications referenced above are incorporated herein by reference.

FIELD

The present disclosure relates to a high-voltage startup circuit for systems that require DC power to operate when power is initially turned on.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a power supply 100 converts an alternating current (AC) line voltage 101 to one or more direct current (DC) voltages that are suitable for a load 102. The AC line voltage 101 may be 110V, 60 Hz or 220V, 50 Hz. The DC voltages may include a fraction of 1V, 1.5V, ±5V, ±12V, 24V, or any other suitable value to drive the load 102. The power supply 100 includes a step-down transformer 104 and a rectifier 106. The step-down transformer 104 converts the AC line voltage 101 to an AC voltage having a smaller value than the AC line voltage 101 (e.g., 24V AC, 12V AC, and so on) depending on the value of the DC voltage to be generated. The rectifier 106 converts the AC voltage output by the step-down transformer 104 to the DC voltage and outputs the DC voltage to the load 102.

Referring now to FIG. 2, a power supply 150 converts the AC line voltage 101 to one or more DC voltages that are suitable for the load 102. The power supply 150 includes a rectifier 152 and a DC-to-DC converter 154. The rectifier 152 converts the AC line voltage 101 to a DC voltage. The DC-to-DC converter 154 converts the DC voltage output by the rectifier 152 to the one or more DC voltages that are suitable for operating the load 102.

The DC-to-DC converter 154 typically includes a switching controller (e.g., a pulse width modulation (PWM) controller). The switching controller requires a DC voltage for operation. The DC voltage required to operate the switching controller at startup (i.e., when power is turned on) is typically generated using a resistor. The resistor drops the AC line voltage 101 to a low value, which is used to power the switching controller at startup. Subsequently, when the DC voltages to operate the load 102 are generated, the switching controller is operated using one of the DC voltages.

An efficiency of a power supply is given by a ratio of an output voltage of the power supply to an input voltage of the power supply. The efficiency of the power supply 150 is very low. For example, if the value of the DC voltage supplied by the power supply 150 to the load 102 is 5V, and the value of the AC line voltage 101 is 120V (i.e., approximately 170V RMS), then the efficiency of the power supply 150 is 5/170=approximately 3%. If the DC voltage supplied to the load 102 is 12V, and the AC line voltage 101 is 220V (i.e., approximately 311V RMS), then the efficiency of the power supply 150 is 12/311=approximately 4%.

Additionally, the resistor used to power the switching controller at startup dissipates power. Further, in some applications, the power supply 150 continues to operate and therefore dissipates power although the load 102 may be switched from a normal operating mode to a power-save mode.

SUMMARY

A system comprises a power transistor configured to receive an alternating current (AC) line voltage and a control circuit. During a rising portion of a half cycle of the AC line voltage, the control circuit is configured to turn on the power transistor when the AC line voltage reaches a first value and turn off the power transistor when the AC line voltage reaches a second value. The second value is greater than the first value. During a falling portion of the half cycle, the control circuit is configured to turn on the power transistor when the AC line voltage reaches the second value and turn off the power transistor when the AC line voltage reaches the first value.

In other features, the system further comprises a capacitance, where the power transistor charges the capacitance when the power transistor is turned on, and where the capacitance outputs a voltage having a value less than the first value.

In other features, the control circuit is configured to turn off the power transistor when the voltage output by the capacitance is greater than or equal to the first value.

In other features, the system further comprises a power supply configured to generate a direct current (DC) voltage based on the AC line voltage and a controller configured to control the power supply. The voltage output by the capacitance powers the controller.

In other features, the control circuit is configured to disable the power transistor.

In still other features, a system comprises a power transistor configured to receive an alternating current (AC) line voltage and charge a capacitance to an output voltage based on when the power transistor is turned on during a half cycle of the AC line voltage. The system further comprises a control circuit configured to turn on the power transistor to charge the capacitance when the AC line voltage is between a first value and a second value during a half cycle of the AC line voltage, where the first value is greater than or equal to the output voltage, and where the second value is greater than the first value by a predetermined amount. The control circuit is further configured to turn off the power transistor when the AC line voltage is not between the first value and the second value during the half cycle of the AC line voltage or when the capacitance is charged to the output voltage.

In other features, the system further comprises a controller configured to control a power supply, where the power supply generates a direct current (DC) voltage based on the AC line voltage, and where the capacitance outputs the output voltage to the controller.

In other features, the control circuit is configured to turn off the power transistor and components of the control circuit.

In other features, the control circuit comprises a voltage divider configured to divide the AC line voltage, a comparator configured to compare an output of the voltage divider to a reference voltage, and a switch configured to, based on the comparison, turn on the power transistor when the AC line voltage is between the first value and the second value, and to turn off the power transistor when the AC line voltage is not between the first value and the second value.

In other features, the control circuit comprises a voltage divider configured to divide the output voltage, a comparator configured to compare an output of the voltage divider to a reference voltage, and a switch configured to, based on the comparison, turn on the power transistor when the AC line voltage is between the first value and the second value and when the capacitance is charged to less than the output voltage, and to turn off the power transistor when the capacitance is charged to greater than or equal to the output voltage.

In still other features, an integrated circuit (IC) comprises a first resistance having a first end connected to an alternating current (AC) line voltage, and a second end; and a second resistance having a first end connected to the second end of the first resistance, and a second end. The system further comprises a first comparator having a first input connected to the second end of the first resistance, a second input connected to a reference voltage, and a first output. The system further comprises a first transistor having a gate connected to the first output of the first comparator, a source connected to the second end of the second resistance, and a drain; and a second transistor having a source connected to the second end of the second resistance, a drain connected to the drain of the first transistor, and a gate. The system further comprises a second comparator having a second output connected to the gate of the second transistor, a first input connected to the reference voltage, and a second input. The system further comprises a third resistance having a first end connected to the second end of the second resistance and a second end connected to the second input of the second comparator; and a fourth resistance having a first end connected to the second input of the second comparator and a second end. The system further comprises a fifth resistance having a first end connected to the second end of the fourth resistance and a second end connected to the drain of the first transistor. The system further comprises a diode having a cathode connected to the first end of the fifth resistance and an anode. The system further comprises a third transistor having a source connected to the anode of the diode, a drain connected to the first end of the first resistance, and a control terminal connected to the drain of the second transistor. The system further comprises a capacitance having a first end connected to the cathode of the diode and a second end connected to the second end of the second resistance.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 1 is a functional block diagram of a power supply that rectifies a stepped-down alternating current (AC) line voltage according to the prior art;

FIG. 2 is a functional block diagram of a power supply that rectifies the AC line voltage and generates one or more DC voltages according to the prior art;

FIG. 4B is a graph depicting the AC line voltage, an output voltage of the startup circuit, and a drain current supplied by the startup circuit as a function of time.

DESCRIPTION

The present disclosure relates to a startup circuit that supplies power at startup (i.e., when power is turned on) to a system that draws power from AC line voltage (e.g., 120V AC) and that requires power (e.g., 5V DC) to operate at startup. For example, the startup circuit provides power to a switching controller of a power supply at startup. Based on the power provided by the startup circuit, the switching controller can control the operation of the power supply at startup so that the power supply can generate one or more DC voltages from the AC line voltage to operate a load.

After the power supply generates the DC voltages, one of the DC voltages can be used to power the switching controller. Based on the DC voltage generated by the power supply, the switching controller continues operation and controls the power supply. The startup circuit can be disabled after the DC voltage generated by the power supply is used to power the switching controller. The principles of the present disclosure, while described using a power supply as an example, can be applied to any system that draws power from the AC line voltage and that requires power such as 5V DC to operate at startup.

Figure 3A:
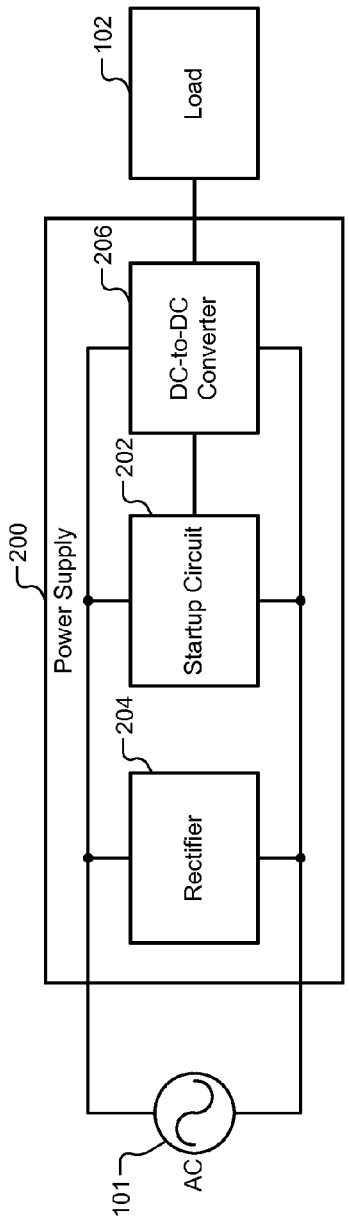
FIGS. 3A and 3B are functional block diagrams of a power supply including a startup circuit according to the present disclosure.
Figure 3B:
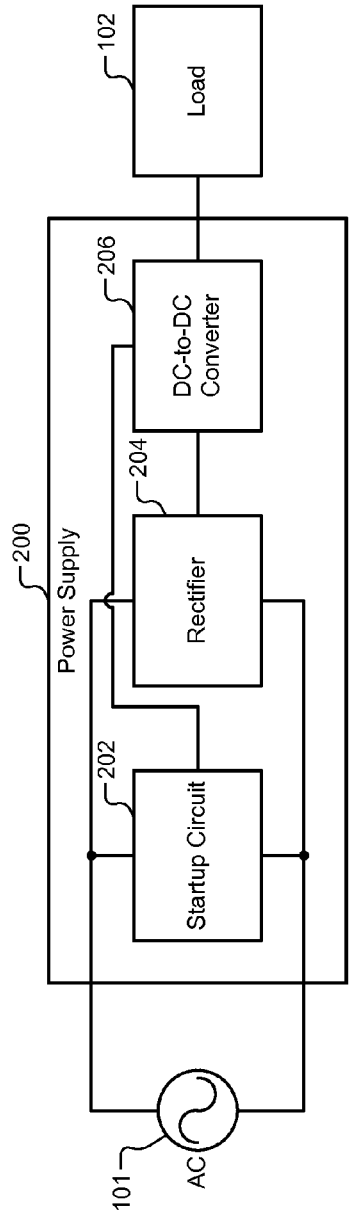

Referring now to FIGS. 3A and 3B, a power supply 200 comprising a startup circuit 202 according to the present disclosure is shown. In FIG. 3A, the startup circuit 202 is arranged between a rectifier 204 and a DC-to-DC converter 206. In FIG. 3B, the startup circuit 202 is arranged between the AC line voltage 101 and the rectifier 204. In either arrangement, the startup circuit 202 draws power from the AC line voltage 101 during startup and supplies a DC voltage suitable for operating components (e.g., a switching controller) of the DC-to-DC converter 206. The DC-to-DC converter 206 generates one or more DC voltages suitable for operating the load 102. After the DC voltages are generated, the DC-to-DC converter 206 uses one of the DC voltages to operate components such as the switching controller of the DC-to-DC converter 206 and disables the startup circuit 202.

Figure 4A:
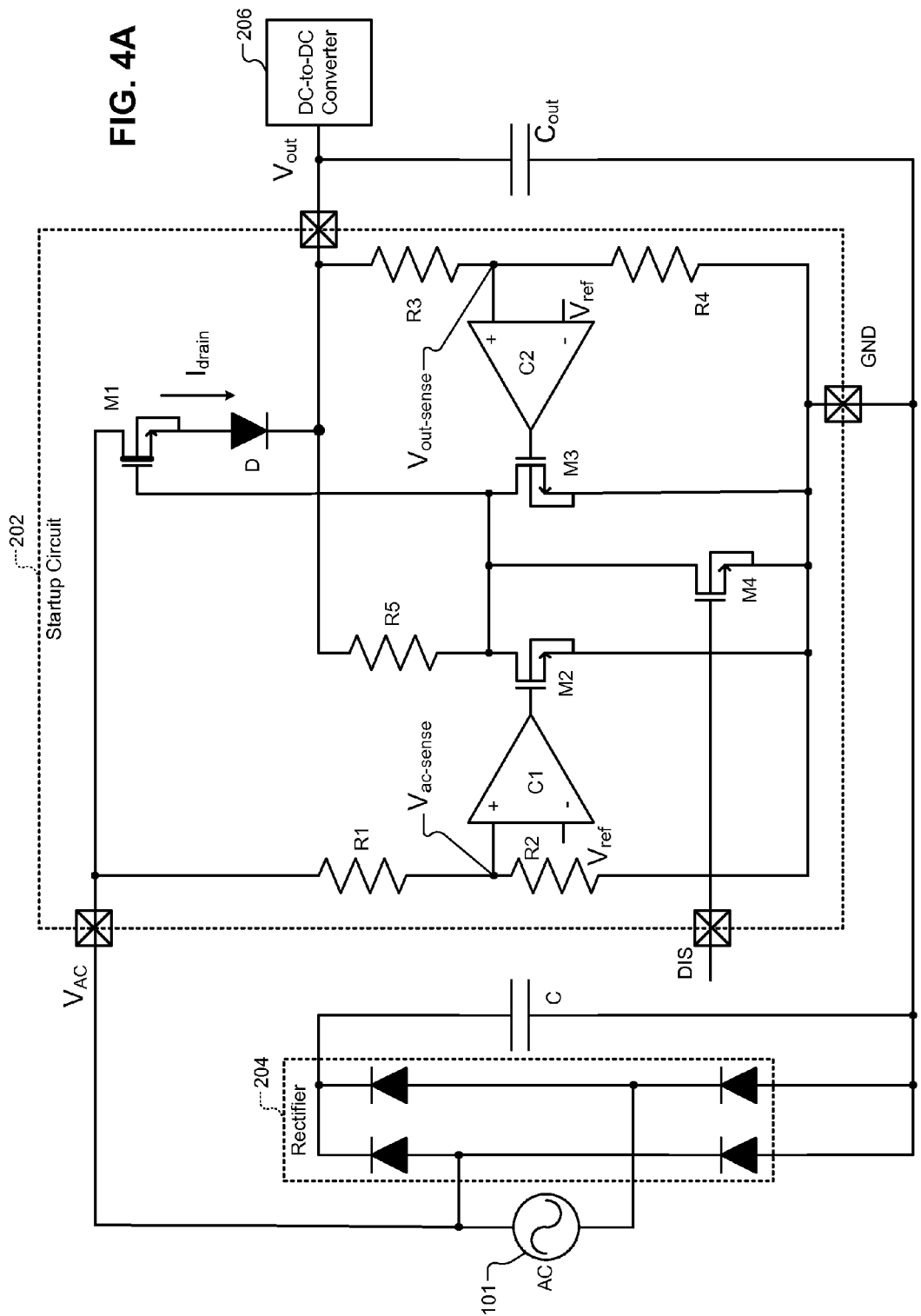
FIG. 4A is a schematic of the startup circuit.

Referring now to FIGS. 4A and 4B, the startup circuit 202 is shown in detail. In FIG. 4A, the startup circuit 202 charges a capacitor $C_{out}$ during each half cycle of the AC line voltage at startup. The startup circuit 202 charges the capacitor $C_{out}$ to an output voltage $V_{out}$. The capacitor $C_{out}$ supplies the output voltage $V_{out}$ to a component such as a switching controller (not shown) of the DC-to-DC converter 206 at startup. For example only, suppose that the switching controller requires 5V DC to operate. The startup circuit 202 charges the capacitor $C_{out}$ to 5V DC and supplies 5V DC to the switching controller at startup.

The startup circuit 202 charges the capacitor $C_{out}$ when the value of the AC line voltage is between a first value and a second value during each half cycle of the AC line voltage. The first value is selected based on the value of the output voltage $V_{out}$. The second value is greater than the first value. For example, if $V_{out}$=5V, the first value may be any value greater than 5V. For example only, suppose that the first value is 5.1V. The second value may be 6V, 7V, 8V, or any value greater than the first value. For example only, suppose that the second value is 6V.

In FIG. 4B, the startup circuit 202 begins charging the capacitor $C_{out}$ at time t1 during a half cycle of the AC line voltage when the AC line voltage increases from zero to a first value greater than 5V RMS (e.g., 5.1V RMS). The startup circuit 202 charges the capacitor $C_{out}$ until time t2 when the AC line voltage increases to a second value greater than the first value (e.g., 6V RMS). The startup circuit 202 stops charging the capacitor $C_{out}$ at time t2 when the AC line voltage is greater than or equal to the second value (e.g., 6V RMS).

Subsequently, the AC line voltage increases to a peak value (e.g., 1.44*110V) and begins to decrease. The startup circuit 202 again begins charging the capacitor $C_{out}$ at time t3 when the AC line voltage decreases from the peak value to the second value (e.g., 6V RMS). The startup circuit 202 charges the capacitor $C_{out}$ until time t4 when the AC line voltage decreases from the second value to the first value (e.g., from 6V RMS to 5.1V RMS). The startup circuit 202 stops charging the capacitor $C_{out}$ at time t4 when the AC line voltage is less than or equal to the first value (e.g., 5.1V RMS). The AC line voltage then returns to zero, and the cycle is repeated according to a line frequency of the AC line voltage (e.g., 50 Hz). The capacitor $C_{out}$ outputs the output voltage $V_{out}$=5V to the switching controller.

Based on the output voltage $V_{out}$ supplied by the startup circuit 202, the switching controller of the DC-to-DC converter 206 operates during startup, and the DC-to-DC converter 206 generates one or more DC voltages to operate the load 102. Subsequently, one of the DC voltages generated by the DC-to-DC converter 206 (e.g., 5V) is used to power the switching controller, and the startup circuit 202 can be disabled.

In the above example, the capacitor $C_{out}$ is charged when the input voltage to the startup circuit 202 is between 5V RMS and 6V RMS. Since the maximum input voltage to the startup circuit 202 is 6V RMS, and the output voltage of the startup circuit 202 is 5V, the worst-case efficiency of the startup circuit 202 is 5/6=approximately 83%. The startup circuit 202 is now described in detail.

In FIG. 4A, the startup circuit 202 can be manufactured as an integrated circuit (IC) having four pins: $V_{AC}$, $V_{out}$, disable (DIS), and ground (GND). The $V_{AC}$ pin is connected to the AC line voltage 101. The $V_{out}$ pin is connected to the output capacitor $C_{out}$ and supplies the output voltage $V_{out}$ generated by the startup circuit 202 to the DC-to-DC converter 206 at startup. The GND pin is connected to ground. The DIS pin can be used to input a disable signal to turn off the startup circuit 202 after the startup (i.e., after the DC-to-DC converter 206 generates the one or more DC voltages) to save power. For example, the DC-to-DC converter 206 may send a control signal to the DIS pin after the DC-to-DC converter 206 generates the one or more DC voltages. The control signal turns off the startup circuit 202. Alternatively, the DIS pin can be connected to ground when unused.

The startup circuit 202 includes a super-high voltage, depletion-mode power transistor M1 that is controlled by comparators C1 and C2; transistors M2, M3, and M4; and resistors R1 through R5. The comparators C1 and C2; transistors M2, M3, and M4; and resistors R1 through R5 may be called a control circuit that controls the power transistor M1. The transistors M2, M3, and M4 may be CMOSFETs. The resistors R1 and R2 are high-voltage resistors.

A gate voltage of the power transistor M1 is determined by the resistor R5 and the transistors M2, M3, and M4. The transistors M2, M3, and M4 are controlled by the AC line voltage $V_{AC}$, the output voltage $V_{out}$, and the disable input (DIS), respectively. The resistor R5 is used to charge the gate voltage of the power transistor M1 to $V_{out}$. A diode D is a reverse blocking diode that prevents the output voltage $V_{out}$ from discharging through a body diode of the power transistor M1.

When power is turned on (i.e., at startup), $V_{out}$ is initially low; the transistors M2, M3, and M4 are turned off; and the gate voltage of the power transistor M1 is equal to $V_{out}$. Since the power transistor M1 is a depletion mode MOSFET, the threshold voltage is negative, and the channel is already formed. Consequently, the power transistor M1 is turned on when power is initially turned on. The capacitor $C_{out}$ is charged by the AC line voltage close to the threshold voltage of the power transistor M1. A bandgap reference (BGR) generator (not shown) supplies a reference voltage $V_{ref}$ to the comparators C1 and C2.

The comparator C1 receives a signal $V_{ac\_sense}$ that provides an indication of the AC line voltage $V_{AC}$. The signal $V_{ac\_sense}$ is generated using a resistor divider comprising the resistors 131 and R2. Specifically, $V_{ac\_sense}=V_{AC}*R2/(R1+R2)$. When $V_{AC}$ is greater than $V_{ac\_sense}$, the transistor M2 turns on and pulls the gate voltage of the power transistor M1 to ground to turn off the power transistor M1. In the above example, the comparator C1 turns off the power transistor M1 when $V_{AC}$ is greater than or equal to 6V RMS. The value of $V_{AC}$ at which to turn off the power transistor M1 (e.g., 6V RMS) can be set to any value (e.g., 7V RMS, 8V RMS, 9V RMS, and so on) by selecting values of the resistors R1 and R2.

The comparator C2 receives a signal $V_{out\_sense}$ that provides an indication of the output voltage $V_{out}$. The signal $V_{out\_sense}$ is generated using a resistor divider comprising the resistors R3 and R4. Specifically, $V_{out\_sense}=V_{out}*R4/(R3+R4)$. When the output voltage $V_{out}$ is greater than $V_{out\_sense}$, the transistor M3 turns on and pulls the gate voltage of the power transistor M1 to ground to turn off the power transistor M1. In the above example, the comparator C2 turns off the power transistor M1 and stops charging the capacitor $C_{out}$ when the output voltage $V_{out}$ reaches 5V. The output voltage $V_{out}$ is therefore limited to 5V and cannot exceed 5V.

Accordingly, in this example, the comparator C1 turns on the power transistor M1 and allows charging of the capacitor $C_{out}$ when $V_{AC}$ is less than 6V RMS and $V_{out}$ is less than 5V, and turns off the power transistor M1 and stops charging the capacitor $C_{out}$ when $V_{AC}$ is greater than or equal to 6V RMS. The comparator C2 allows the comparator C1 to turn on the power transistor M1 when $V_{AC}$ is less than 6V RMS and allows charging of the capacitor $C_{out}$ when $V_{out}$ is less than 5V, and turns off the power transistor M1 and stops charging the capacitor $C_{out}$ when $V_{out}$ is equal to 5V.

The disable (DIS) input of the startup circuit 202 is an optional control that can be used by an independent application-specific controller to turn off the start-up circuit 202 to save power. For example, when the DIS pin is pulled up, the transistor M4 turns on and pulls the gate voltage of the power transistor M1 to ground to turn off the power transistor MI. The transistor M4 turns off the power transistor M1 regardless of the states of the transistors M2 and M3 determined by the comparators CI and C2. Alternatively, the power transistor M1 can also be turned off by applying a voltage greater than $V_{out}$ at the $V_{out}$ pin. The voltage greater than $V_{out}$ may be generated by a power supply (e.g., the DC-to-DC converter 206).

In FIG. 4B, when power is turned on, the AC line voltage $V_{AC}$ (or the output voltage $V_{rect}$ of the rectifier 204) increases from zero. At time t1, $V_{AC}$ increases from zero to 5.1V RMS, for example. The power transistor M1 is turned on at time t1. At time t2, $V_{AC}$ increases from 5.1V RMS to 6V RMS, for example. The power transistor M1 is turned on until time t2 and turned off at time t2. Subsequently, $V_{AC}$ increases to a peak value of $V_{AC}$ and starts to decrease. At time t3, $V_{AC}$ decreases from the peak value to 6V, for example. The power transistor M1 is turned on at time t3. At time t4, $V_{AC}$ decreases from 6V to 5.1V, for example. The power transistor M1 is turned on until time t4 and turned off at time t4. Subsequently, $V_{AC}$ decreases to 0V, and the cycle repeats at the line frequency of the AC line voltage $V_{AC}$.

A drain current $I_{drain}$ flows through the power transistor M1 and charges the capacitor $C_{out}$ to the output voltage $V_{out}$ from time t1 to t2 and from time t3 to t4. The output voltage $V_{out}$ increases from time t1 to t2 and from time t3 to t4. The power transistor M1 is turned off and does not charge the capacitor $C_{out}$ at other times during the half cycle. The capacitor $C_{out}$ discharges from time t2 to t3 and from time t4 to t1. The output voltage $V_{out}$ therefore decreases from time t2 to t3 and from time t4 to t1.

Figure 5:
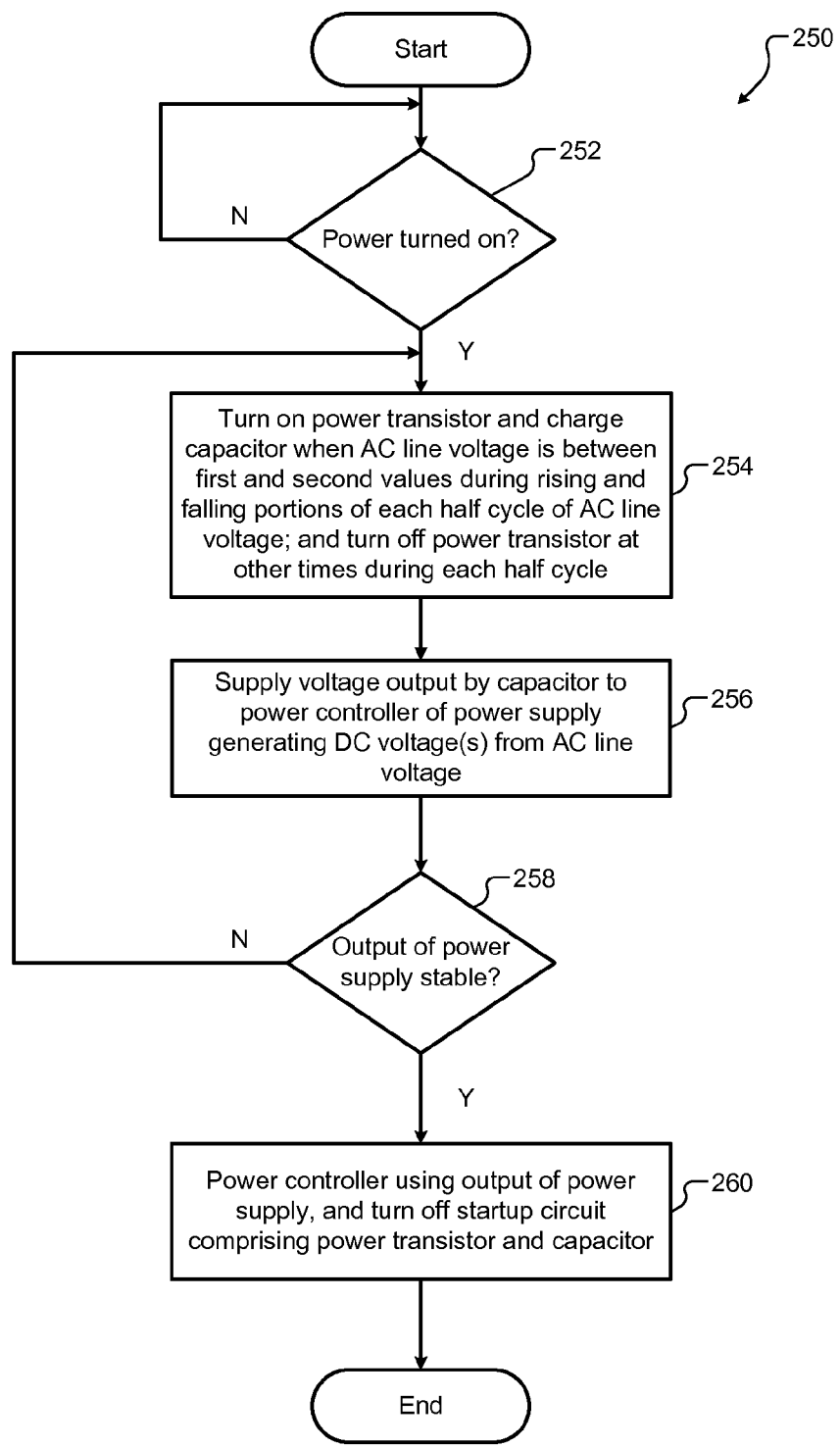
FIG. 5 is a flowchart of a method for powering a controller of a power supply at startup (i.e., when power is turned on).

Referring now to FIG. 5, a method 250 for powering a controller of a power supply at startup (i.e., when power is turned on) is shown. At 252, control determines if power to a power supply (e.g., AC line voltage) is turned on and waits until power is turned on. At 254, when power is turned on, control turns on a power transistor and charges a capacitor when the AC line voltage is between a first value and a second value during rising and falling portions of each half cycle of the AC line voltage. Control turns off the power transistor at other times during each half cycle. Control also turns the power transistor on and off based on whether the output voltage of the capacitor is less than or equal to a desired voltage (e.g., 5V DC). At 256, control uses the voltage output by the capacitor to power the controller of the power supply. Accordingly, the power supply can generate one or more DC voltages from the AC line voltage. At 258, control determines if the output of the power supply is stable. Control returns to 254 if the output of the power supply is not yet stable. At 260, if the output of the power supply is stable, control uses the output of the power supply to power the controller and turns of the startup circuit comprising the power transistor and the capacitor.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A system comprising:
    a switch configured to receive a first voltage; and
    a control circuit configured to
        during a rising portion of a half cycle of the first voltage, (i) turn on the switch in response to the first voltage reaching a first value, and (ii) turn off the switch in response to the first voltage reaching a second value, wherein the second value is greater than the first value; and
        during a falling portion of the half cycle of the first voltage, (i) turn on the switch in response to the first voltage reaching the second value, and (ii) turn off the switch in response to the first voltage reaching the first value.

2. The system of claim 1, further comprising:
    a capacitance,
    wherein the switch charges the capacitance in response to the switch being turned on,
    wherein the capacitance outputs a second voltage, and
    wherein a value of the second voltage is less than the first value.

3. The system of claim 2, wherein the control circuit is configured to turn off the switch in response to the value of the second voltage output by the capacitance being greater than or equal to the first value of the first voltage.

4. The system of claim 2 further comprising:
    a power supply configured to generate a third voltage based on the first voltage; and
    a controller configured to control the power supply,
    wherein the controller is powered, prior to the power supply generating the third voltage, by the second voltage output by the capacitance.

5. The system of claim 4, wherein the control circuit is configured to disable the switch in response to the power supply (i) generating the third voltage, and (ii) supplying the third voltage to the controller.

6. A system comprising:
    a first switch configured to receive a first voltage and charge a capacitance to a second voltage in response to the first switch being turned on during a half cycle of the first voltage;
    a control circuit configured to
        turn on the first switch to charge the capacitance in response to the first voltage being greater than a first value and less than a second value during the half cycle of the first voltage, wherein the first value is greater than or equal to the second voltage, and wherein the second value is greater than the first value by a predetermined amount, and
        turn off the first switch in response to (i) the first voltage being not greater than the first value and not less than the second value during the half cycle of the first voltage, or (ii) the capacitance being charged to the second voltage;
    a second switch to control the first switch based on the first voltage; and
    a third switch to control the first switch based on the second voltage,
    wherein outputs of the second switch and the third switch are directly connected to a control input of the first switch.

7. The system of claim 6, further comprising:
    a controller configured to control a power supply, wherein the power supply generates a third voltage based on the first voltage, and wherein the controller is powered, prior to the power supply generating the third voltage, by the second voltage output by the capacitance.

8. The system of claim 7, wherein the control circuit is configured to disable the first switch in response to the power supply (i) generating the third voltage, and (ii) supplying the third voltage to the controller.

9. The system of claim 6, wherein the control circuit comprises:
a voltage divider configured to divide the first voltage; and
a comparator configured to compare an output of the voltage divider to a reference voltage;
wherein the second switch is configured to, based on the comparison, (i) turn on the first switch in response to the first voltage being greater than the first value and less than the second value, and (ii) turn off the first switch in response to the first voltage being not greater than the first value and not less than the second value during the half cycle of the first voltage.

10. The system of claim 6, wherein the control circuit comprises:
a voltage divider configured to divide the second voltage output by the capacitance; and
a comparator configured to compare an output of the voltage divider to a reference voltage;
wherein the third switch is configured to, based on the comparison,
turn on the first switch in response to (i) the first voltage being greater than the first value and less than the second value, and (ii) the capacitance being charged to less than the second voltage; and
turn off the first switch in response to the capacitance being charged to greater than or equal to the second voltage.

11. An integrated circuit, comprising:
a first resistance including a first terminal and a second terminal, wherein the first terminal is connected to a first voltage;
a second resistance including a first terminal and a second terminal, wherein the first terminal of the second resistance is connected to the second terminal of the first resistance;
a first comparator including a first input, a second input, and a first output, wherein the first input is connected to the second terminal of the first resistance, and wherein the second input is connected to a reference voltage;
a first switch including a first terminal, a second terminal, and a control terminal, wherein the first terminal is connected to the second terminal of the second resistance, and wherein the control terminal is connected to the first output of the first comparator;
a second switch including a first terminal, a second terminal, and a control terminal, wherein the first terminal of the second switch is connected to the second terminal of the second resistance, and wherein the second terminal of the second switch is connected to the second terminal of the first switch;
a second comparator including a first input, a second input, and a second output, wherein the first input of the second comparator is connected to the reference voltage, and wherein the second output is connected to the control terminal of the second switch;

a third resistance including a first terminal and a second terminal, wherein the first terminal of the third resistance is connected to the second terminal of the second resistance, and wherein the second terminal of the third resistance is connected to the second input of the second comparator;
a fourth resistance including a first terminal and a second terminal, wherein the first terminal of the fourth resistance is connected to the second input of the second comparator;
a fifth resistance including a first terminal and a second terminal, wherein the first terminal of the fifth resistance is connected to the second terminal of the fourth resistance, and wherein the second terminal of the fifth resistance is connected to the second terminal of the first switch;
a diode including a first terminal and a second terminal, wherein the first terminal of the diode is connected to the first terminal of the fifth resistance;
a third switch including a first terminal, a second terminal, and a control terminal, wherein the first terminal of the third switch is connected to the second terminal of the diode, wherein the second terminal of the third switch is connected to the first terminal of the first resistance, and wherein the control terminal of the third switch is connected to the second terminal of the second switch; and
a capacitance including a first terminal and a second terminal, wherein the first terminal of the capacitance is connected to the first terminal of the diode, and wherein the second terminal of the capacitance is connected to the second terminal of the second resistance.

12. The integrated circuit of claim 11, further comprising:
a fourth switch including a first terminal, a second terminal, and a control terminal, wherein the first terminal of the fourth switch is connected to the second terminal of the second resistance, and wherein the second terminal of the fourth switch is connected to the second terminal of the first switch,
wherein the fourth switch is configured to turn off the third switch irrespective of states of the first switch and the second switch in response to the control terminal of the fourth switch being pulled up.

13. A method comprising:
supplying a first voltage to a switch;
during a rising portion of a half cycle of the first voltage, (i) turning on the switch in response to the first voltage reaching a first value, and (ii) turning off the switch in response to the first voltage reaching a second value, wherein the second value is greater than the first value; and
during a falling portion of the half cycle, (i) turning on the switch in response to the first voltage reaching the second value, and (ii) turning off the switch in response to the first voltage reaching the first value.

14. The method of claim 13, further comprising:
charging a capacitance to a second voltage in response to the switch being turned on,
wherein a value of the second voltage is less than the first value.

15. The method of claim 14, further comprising turning off the switch in response to the value of the second voltage output by the capacitance being greater than or equal to the first value of the first voltage.

16. The method of claim 14, further comprising:
generating a third voltage based on the first voltage using a power supply; and supplying, prior to the power supply generating the third voltage, the second voltage output by the capacitance to a controller configured to control the power supply.

17. The method of claim 16, further comprising disabling the switch in response to the power supply (i) generating the third voltage, and (ii) supplying the third voltage to a controller configured to control the power supply.

18. A method comprising:
supplying a first voltage to a first switch;
charging a capacitance to a second voltage in response to the first switch being turned on during a half cycle of the first voltage;
turning on the first switch to charge the capacitance in response to the first voltage being greater than a first value and less than a second value during a half cycle of the first voltage, wherein the first value is greater than or equal to the second voltage, and wherein the second value is greater than the first value by a predetermined amount;
turning off the first switch in response to (i) the first voltage being not greater than the first value and not less than the second value during the half cycle of the first voltage, or (ii) in response to the capacitance being charged to the second voltage;
controlling the first switch based on the first voltage using a second switch; and
controlling the first switch based on the second voltage using a third switch,
wherein outputs of the second switch and the third switch are directly connected to a control input of the first switch.

19. The method of claim 18, further comprising controlling, based on the second voltage, a power supply configured to generate a third voltage based on the first voltage.

20. The method of claim 19, further comprising disabling the first switch in response to the power supply (i) generating the third voltage, and (ii) supplying the third voltage to a controller configured to control the power supply.

21. The method of claim 18, further comprising:
dividing the first voltage using a voltage divider;
comparing an output of the voltage divider to a reference voltage; and
based on the comparison, using the second switch, (i) turning on the first switch in response to the first voltage being greater than the first value and less than the second value, and (ii) turning off the first switch in response to the first voltage being not greater than the first value and not less than the second value during the half cycle of the first voltage.

22. The method of claim 18, further comprising:
dividing the second voltage output by the capacitance using a voltage divider;
comparing an output of the voltage divider to a reference voltage; and
based on the comparison, using the third switch, (i) turning on the first switch in response to the first voltage being greater than the first value and less than the second value, and in response to the capacitance being charged to less than the second voltage; and (ii) turning off the first switch in response to the capacitance being charged to greater than or equal to the second voltage.

* * * * *